United States Patent [19]

Shirahata

[11] Patent Number: 5,302,682

[45] Date of Patent: Apr. 12, 1994

[54] METHOD FOR THE PREPARATION OF DIORGANOSILOXANE-DIORGANOSILAZANE COPOLYMER

[75] Inventor: Akihiko Shirahata, Chiba, Japan

[73] Assignee: Dow Corning Toray Silicone Co., Ltd., Tokyo, Japan

[21] Appl. No.: 89,203

[22] Filed: Jul. 8, 1993

[30] Foreign Application Priority Data

Jul. 21, 1992 [JP] Japan .................. 4-215530

[51] Int. Cl.⁵ .............................. C08G 77/04
[52] U.S. Cl. ........................ 528/14; 528/37; 525/477
[58] Field of Search .............. 528/14, 37; 525/477

[56] References Cited

U.S. PATENT DOCUMENTS

| | | | |
|---|---|---|---|
| 4,584,355 | 4/1986 | Blizzard et al. | 525/477 |
| 4,617,078 | 10/1986 | Takahashi et al. | 156/307.5 |
| 4,678,688 | 7/1987 | Itoh et al. | 528/28 |
| 4,683,320 | 7/1987 | Hida et al. | 556/453 |
| 4,725,643 | 2/1988 | Burkhardt | 524/789 |
| 4,835,237 | 5/1989 | Burkhardt et al. | 528/21 |

FOREIGN PATENT DOCUMENTS 145815 of 1985 Japan .

OTHER PUBLICATIONS

Journal of Paint Technology 42 (543), 220–226 (1970).

Primary Examiner—Melvyn I. Marquis
Attorney, Agent, or Firm—Alexander Weitz

[57] ABSTRACT

A method for the preparation of a random diorganosiloxane-diorganosilazane copolymer is disclosed, which method comprises polymerizing
(A) a mixture or polymerization reaction product of
 (a) a hexaorganodisiloxane and
 (b) a cyclic diorganosiloxane with
(B) a cyclic diorganosilazane of the formula

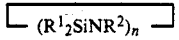

$$(R^1{}_2SiNR^2)_n$$

wherein $R^1$ is a monovalent hydrocarbon group, $R^2$ is hydrogen or a monovalent hydrocarbon group and n is 3 or 4, the polymerization being carried out in the presence of cesium hydroxide.

11 Claims, No Drawings

METHOD FOR THE PREPARATION OF DIORGANOSILOXANE-DIORGANOSILAZANE COPOLYMER

DESCRIPTION OF THE INVENTION

The present invention relates to a method for the preparation of diorganosiloxane-diorganosilazane copolymer. More specifically, the present invention relates to a method for the preparation of straight-chain diorganosiloxane-diorganosilazane copolymer in which the diorganosiloxane units and diorganosilazane units are randomly dispersed.

BACKGROUND OF THE INVENTION

Based on the hydrolyzability of the diorganosilazane unit, diorganosiloxane-diorganosilazane copolymers have been proposed as water repellents for powders, fibers, and inorganic substrates. The following methods, for example, have been proposed for the preparation of diorganosiloxane-diorganosilazane copolymer:

(a) the preparation of diorganosiloxane-diorganocyclosilazane copolymer has been proposed by means of a co-condensation reaction between 1,3-bis(-dimethyllithiumoxysilyl)tetramethylcyclodisilazane and diorganopolysiloxane having silicon-bonded chlorine at both molecular chain terminals (Journal of Paint Technology.

42 543 220,1970); and (b) the preparation of diorganosiloxane-diorganosilazane copolymer has also been proposed by the reaction, in ammonia or primary amine, of a mixture of diorganodihalosilane and diorganosiloxane having silicon-bonded chlorine at both molecular chain terminals (Japanese Patent Application Laid Open (Kokai or Unexamined) Number Sho 60-145815 (145,815/1985).

However, the preparative method proposed in the *Journal of Paint Technology* article requires the use of difficult-to-handle butyllithium and can produce only block-type diorganosiloxane-diorganosilazane copolymer. The method proposed in Japanese Patent Application Laid Open Number Sho 60-145815 requires isolation of the product from the large quantity of ammonium chloride that is produced during the reaction process. In addition, this method again can produce only block-type diorganosiloxane-diorganosilazane copolymer.

In pursuit of the preparation of straight-chain diorganosiloxane-diorganosilazane copolymer in which the diorganosiloxane units and diorganosilazane units are randomly dispersed, the present inventor experimented with the equilibration polymerization of cyclic diorganosiloxane and cyclic diorganosilazane using basic catalysts such as sodium hydroxide and potassium hydroxide. It was found, however, that diorganosiloxane-diorganosilazane copolymer could not be obtained even with heating up to the boiling point of the starting materials.

SUMMARY OF THE INVENTION

The present invention solves the problems described above and takes as its object the introduction of a method for the preparation of straight-chain diorganosiloxane-diorganosilazane copolymer in which the diorganosiloxane units and diorganosilazane units are randomly dispersed.

The present invention thus relates to a method for the preparation of diorganosiloxane-diorganosilazane copolymer, said method comprising equilibrating:

(A) a mixture or polymerization reaction product of
  (a) a hexaorganodisiloxane and
  (b) a cyclic diorganopolysiloxane and
(B) a cyclic diorganosilazane with the general formula $$(R^1{}_2SiNR^2)_n$$

where $R^1$ is a monovalent hydrocarbon group, $R^2$ is hydrogen or a monovalent hydrocarbon group, and $n = 3$ or 4, in the presence of
(C) cesium hydroxide.

DETAILED DESCRIPTION OF THE INVENTION

Component (A) of the present invention consists of mixture, or polymerization reaction product, of components (a) and (b). The hexaorganodisiloxane comprising component (a) is defined by the following general formula.

$$R^1{}_3SiOSiR^1{}_3$$

Component (a) functions as a molecular chain end blocking group in the instant preparative method. $R^1$ in the above formula comprises monovalent hydrocarbon groups and is specifically but nonexhaustively exemplified by alkyl groups such as methyl, ethyl, propyl, and butyl; alkenyl groups such as vinyl, allyl, butenyl, and hexenyl; aryl groups such as phenyl, tolyl, and xylyl; and aralkyl groups such as benzyl and phenylethyl. The hexaorganodisiloxane comprising component (a) is specifically but nonexhaustively exemplified by 1,1,1,3,3,3-hexamethyldisiloxane, 1,1,3,3-tetramethyl-1,3-divinyldisiloxane, 1,1,3,3-tetramethyl-1,3-diphenyldisiloxane, 1,1,1,3,3,3-hexaphenyldisiloxane, 1,1,1,3,3-pentamethyl-3-vinyldisiloxane, 1,1,1,3,3-pentamethyl-3-phenyldisiloxane, and 1,1,3,3-tetramethyl-1-phenyl-3-vinyldisiloxane. These may be used individually or in combinations of two or more.

The cyclic diorganosiloxane comprising component (b) is defined by the general formula $$(R^1{}_2SiO)_m$$

in which $R^1$ is a monovalent hydrocarbon group and m is an integer with a value of at least 3. It is this component that introduces diorganosiloxane units into the diorganosiloxane-diorganosilazane copolymer afforded by the preparative method of the present invention. $R^1$ in the above formula is exemplified by the same monovalent hydrocarbon groups as given above. The subscript m must be an integer with a value of at least 3 because cyclic diorganosiloxane does not exist for $m = 2$. The cyclic diorganosiloxane comprising component (b) is specifically but nonexhaustively exemplified by cyclic diorganosiloxanes such as 1,1,3,3,5,5-hexamethylcyclotrisiloxane, 1,3,5-trimethyl-1,3,5-trivinylcyclotrisiloxane, 1,3,5-trimethyl-1,3,5-triphenylcyclotrisiloxane, 1,1,3,3,5,5-hexaphenylcyclotrisiloxane, 1,1,3,3,5,5,7,7-octamethylcyclotetrasiloxane, 1,3,5,7-tetramethyl-1,3,5,7-tetravinylcyclotetrasiloxane, 1,3,5,7-tetramethyl-1,3,5,7-tetraphenylcyclotetrasiloxane, and 1,1,3,3,5,5,7,7-octaphenylcyclotetrasiloxane. These may be used individually or in combinations of two or more.

Component (A) is obtained by mixing or polymerizing the aforesaid components (a) and (b). The quantities of components (a) and (b) to be used are not specifically restricted. The end group content in the diorganosiloxane-diorganosilazane copolymer afforded by the preparative method of the present invention can be freely varied by increasing or decreasing the addition of component (a). The content of diorganosiloxane unit in the copolymer under consideration can be freely varied by increasing or decreasing the addition of component (b). Moreover, no specific restriction attaches to the polymerization catalyst used for the polymerization of components (a) and (b), and this catalyst is specifically but nonexhaustively exemplified by basic catalysts such as sodium hydroxide, potassium hydroxide, potassium silanolate, and so forth, and by acidic catalysts such as sulfuric acid, hydrochloric acid, nitric acid, activated clay, and so forth.

For the case of a component (A) comprising the polymerization reaction product afforded by the polymerization of components (a) and (b), component (A) is specifically exemplified by diorganopolysiloxanes such as trimethylsiloxy-terminated dimethylpolysiloxanes, dimethylvinylsiloxy-terminated dimethylpolysiloxanes, trimethylsiloxy-terminated dimethylsiloxane-methylphenylsiloxane copolymers, trimethylsiloxy-terminated dimethylsiloxane-diphenylsiloxane copolymers, trimethylsiloxy-terminated dimethylsiloxane-methylvinylsiloxane copolymers, dimethylvinylsiloxy-terminated dimethylsiloxane-methylphenylsiloxane copolymers, dimethylvinylsiloxy-terminated dimethylsiloxane-diphenylsiloxane copolymers, and so forth, and by polymerization reaction mixtures made up mainly of the preceding diorganopolysiloxanes.

Component (B) comprises cyclic diorganosilazane with the following general formula.

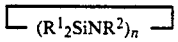
$$[(R^1{}_2SiNR^2)_n]$$

It is this component that introduces the diorganosilazane unit into the diorganosiloxane-diorganosilazane copolymer afforded by the preparative method of the present invention. $R^1$ in the above formula comprises the same monovalent hydrocarbon groups as given above. $R^2$ represents hydrogen or monovalent hydrocarbon groups. These monovalent hydrocarbon groups are exemplified by the same monovalent hydrocarbon groups as for $R^1$. The subscript n has a value of 3 or 4, and this is because the reactivity of the cyclic diorganosilazane is reduced when n is less than 3 or more than 4. The cyclic diorganosilazane comprising component (B) is specifically but nonexhaustively exemplified by 1,1,3,3,5,5-hexamethylcyclotrisilazane, 1,1,3,3,5,5-hexaethylcyclotrisilazane, 1,3,5-trimethyl-1,3,5-trivinylcyclotrisilazane, 1,3,5-trimethyl-1,3,5-triphenylcyclotrisilazane, 1,1,3,3,5,5,7,7-octamethylcyclotetrasilazane, 1,3,5,7-tetramethyl-1,3,5,7-tetravinylcyclotetrasilazane, 1,1,2,3,3,4,5,5,6-nonamethylcyclotrisilazane, 1,1,3,3,5,5-hexamethyl-2,4,6-triethylcyclotrisilazane, and 1,1,2,3,3,4,5,5,6,7,7,8-dodecamethylcyclotetrasilazane. The quantity of addition of component (B) is not specifically restricted. The content of diorganosilazane unit in the diorganosiloxane-diorganosilazane copolymer afforded by the preparative method of the present invention can be freely varied by increasing or decreasing the quantity of addition of component (B).

The cesium hydroxide comprising component (C) functions as an equilibration polymerization catalyst in the preparative method according to the present invention. Its quantity of addition is not specifically restricted as long as a sufficient quantity is added to induce the development of the equilibration polymerization reaction. The preferred range of addition is 5 to 500 ppm based on the total weight of components (A) and (B). The particularly preferred range of addition is 20 to 100 ppm.

The equilibration polymerization reaction conditions are also not specifically restricted in the preparative method in accordance with the present invention. These conditions should be selected as appropriate based on the organic groups present in the starting cyclic diorganosiloxane and cyclic diorganosilazane. In order to obtain a favorable reaction rate in the preparative method of the present invention, the reaction temperature preferably falls within the range of 80° to 200° C., and particularly preferably falls within the range of 120° to 170° C.

Although the equilibration polymerization in the preparative method of the present invention can be run simply by mixing components (A) to (C), an inert organic solvent can be used on an optional basis. Operative inert organic solvents are specifically but nonexhaustively exemplified by aliphatic solvents such as hexane, heptane, octane, nonane, and so forth, and by aromatic solvents such as toluene, xylene, and so forth.

The diorganosiloxane-diorganosilazane copolymer afforded by the preparative method of the present invention is a straight-chain polymer in which the diorganosiloxane units and diorganosilazane units are randomly dispersed. In the same manner as organosilazane compounds, this polymer can be used in water repellents for inorganic powders, fibers, and so forth, in primers for promoting rubber adhesion, in paints, and so forth.

EXAMPLES

The present invention is explained below through illustrative examples. The viscosity values reported in the examples were measured at 25° C.

EXAMPLE 1

The following were introduced into a stirrer-equipped four-neck flask: 8.1 g of 1,1,1,3,3,3-hexamethyldisiloxane, 204.2 g of a cyclic dimethylsiloxane mixture (principal component=1,1,3,3,5,5,7,7-octamethylcyclotetrasiloxane), and 5.1 g of hexamethylcyclotrisilazane. Ten mg of cesium hydroxide was added with stirring, and the mixture was then heated while stirring and a reaction was run for 2 hours at 150° C. After cooling, dry ice was introduced into the reaction system in order to deactivate the polymerization catalyst, and the low boilers were removed at 130° C./5 mm Hg. Filtration then afforded 202 g of a transparent liquid having a viscosity of 72.2 centistokes. This transparent viscous liquid was obtained in a yield of 93%. When this transparent viscous liquid was analyzed by $^{29}Si$ nuclear magnetic resonance spectroscopy (NMR), it was confirmed to be a trimethylsiloxy-terminated, straight-chain dimethylsiloxane-dimethylsilazane copolymer in which the dimethylsiloxane units and dimethylsilazane units were randomly dispersed.

EXAMPLE 2

The procedure of Example 1 was repeated, but in this case using 8.1 g of hexamethyldisiloxane, 193.9 g of a mixture of dimethylsiloxane cyclics (principal component=1,1,3,3,5,5,7,7-octamethylcyclotetrasiloxane), 15.3 g of hexamethylcyclotrisilazane, and 10 mg of cesium hydroxide. The product was 201 g of a transparent viscous liquid with a viscosity of 107 centistokes. This transparent viscous liquid was obtained in a yield of 92.5%. When this transparent viscous liquid was analyzed by $^{29}$Si NMR, it was confirmed to be a trimethylsiloxy-terminated, straight-chain dimethylsiloxane-dimethylsilazane copolymer in which the dimethylsiloxane units and dimethylsilazane units were randomly dispersed.

EXAMPLE 3

The procedure of Example 1 was repeated, but in this case using 8.1 g of 1,1,1,3,3,3-hexamethyldisiloxane, 193.9 g of a mixture of dimethylsiloxane cyclics (principal component= 1,1,3,3,5,5,7,7-octamethylcyclotetrasiloxane), 30.6 g of hexamethylcyclotrisilazane, and 10 mg of cesium hydroxide. The product was 215 g of a transparent viscous liquid with a viscosity of 113 centistokes. This transparent viscous liquid was obtained in a yield of 92.4%. When this transparent viscous liquid was analyzed by $^{29}$Si NMR, it was confirmed to be a trimethylsiloxy-terminated, straight-chain dimethylsiloxane-dimethylsilazane copolymer in which the dimethylsiloxane units and dimethylsilazane units were randomly dispersed.

EXAMPLE 4

The procedure of Example 1 was repeated, but in this case using 0.5 g of 1,1,1,3,3,3-hexamethyldisiloxane, 234.6 g of a mixture of dimethylsiloxane cyclics (principal component=1,1,3,3,5,5,7,7-octamethylcyclotetrasiloxane), 5.8 g of hexamethylcyclotrisilazane, and 10 mg of cesium hydroxide. The product was 210 g of a transparent viscous liquid with a viscosity of 18,400 centistokes. This transparent viscous liquid was obtained in a yield of 87%. When this transparent viscous liquid was analyzed by $^{29}$Si NMR, it was confirmed to be a trimethylsiloxy-terminated, straight-chain dimethylsiloxane-dimethylsilazane copolymer in which the dimethylsiloxane units and dimethylsilazane units were randomly dispersed.

EXAMPLE 5

The following were introduced into a stirrer-equipped four-neck flask: 72.8 g of 1,1,3,3-tetramethyl-1,3-divinyldisiloxane, 1,634 g of a cyclic dimethylsiloxane mixture (principal component =1,1,3,3,5,5,7,7-octamethylcyclotetrasiloxane), and 40.8 g of hexamethylcyclotrisilazane. Fifty mg of cesium hydroxide was added with stirring, and the mixture was then heated while stirring and a reaction was run for 2 hours at 170° C. After cooling, dry ice was introduced into the reaction system in order to deactivate the polymerization catalyst, and the low boilers were removed at 130° C./5 mm Hg. Filtration then afforded 1,640 g of a transparent viscous liquid with a viscosity of 83.2 centistokes. This transparent viscous liquid was obtained in a yield of 94%. When this transparent viscous liquid was analyzed by $^{29}$Si NMR, it was confirmed to be a dimethylvinylsiloxy-terminated, straight-chain dimethylsiloxane-dimethylsilazane copolymer in which the dimethylsiloxane units and dimethylsilazane units were randomly dispersed.

EXAMPLE 6

The following were introduced into a stirrer-equipped four-neck flask 4.1 g of 1,1,1,3,3,3-hexamethyldisiloxane, 150.4 g of a cyclic dimethylsiloxane mixture (principal component=1,1,3,3,5,5,7,7-octamethylcyclotetrasiloxane), 25.0 g of a mixture of diphenylsiloxane cyclics (principal component=1,1,3,3,5,5,7,7-octaphenylcyclotetrasiloxane), and 16.0 g of hexamethylcyclotrisilazane. Fifteen mg of cesium hydroxide was added with stirring, and the mixture was then heated while stirring and a reaction was run for 4 hours at 160° C. After cooling, dry ice was introduced into the reaction system in order to deactivate the polymerization catalyst, and the low boilers were removed at 130° C./5 mm Hg. Filtration then afforded 180 g of a transparent viscous liquid with a viscosity of 3,900 centistokes. This transparent viscous liquid was obtained in a yield of 92%. When this transparent viscous liquid was analyzed by $^{29}$Si NMR, it was confirmed to be a trimethylsiloxy-terminated, straight-chain dimethylsiloxane-diphenylsiloxane-dimethylsilazane copolymer in which the dimethylsiloxane units, diphenylsiloxane units, and dimethylsilazane units were randomly dispersed.

EXAMPLE 7

The following were introduced into a stirrer-equipped four-neck flask: 3.6 g of 1,1,1,3,3,3-hexamethyldisiloxane, 180.5 g of a cyclic dimethylsiloxane mixture (principal component=1,1,3,3,5,5,7,7-octamethylcyclotetrasiloxane), 30.0 g of a mixture of methylphenylsiloxane cyclics (principal component=1,3,5,7-tetramethyl-1,3,5,7-tetraphenylcyclotetrasiloxane), and 24.5 g of hexamethylcyclotrisilazane. Fifteen mg of cesium hydroxide was added with stirring, and the mixture was then heated while stirring and a reaction was run for 4 hours at 160° C. After cooling, dry ice was introduced into the reaction system in order to deactivate the polymerization catalyst, and the low boilers were removed at 130° C./5 mm Hg. Filtration then afforded 215 g of a transparent viscous liquid with a viscosity of 8,700 centistokes. This transparent viscous liquid was obtained in a yield of 90.3%. When this transparent viscous liquid was analyzed by $^{29}$Si NMR, it was confirmed to be a trimethylsiloxy-terminated, straight-chain dimethylsiloxanemethylphenylsiloxane-dimethylsilazane copolymer in which the dimethylsiloxane units, methylphenylsiloxane units, and dimethylsilazane units were randomly dispersed.

EXAMPLE 8

Into a stirrer-equipped four-neck flask were introduced 30 g of hexamethylcyclotrisilazane and 200 g of trimethylsiloxy-terminated dimethylpolysiloxane with a viscosity of 1,000 centistokes. Ten mg of cesium hydroxide was added with stirring, and the mixture was then heated while stirring and a reaction was run for 2 hours at 150° C. After cooling, dry ice was introduced into the reaction system in order to deactivate the polymerization catalyst, and the low boilers were removed at 130° C./5 mm Hg. Filtration then afforded 215 g of a transparent viscous liquid with a viscosity of 1,200 centistokes. This transparent viscous liquid was obtained in a yield of 93.5%. When this transparent viscous liquid was analyzed by $^{29}$Si NMR, it was confirmed to be a trimethylsiloxy-terminated, straight-chain dimethylsiloxane-dimethylsilazane copolymer in which the dimethylsiloxane units and dimethylsilazane units were randomly dispersed.

That which is claimed is:

1. A method for the preparation of a diorganosiloxane-diorganosilazane copolymer, said method comprising equilibration polymerizing
   (A) a mixture or polymerization reaction product of
      (a) a hexaorganodisiloxane of the formula

$$R^1{}_3SiOSiR^1{}_3$$

and
      (b) a cyclic diorganosiloxane of the formula

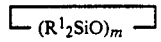

wherein $R^1$ of components (a) and (b) is an independently selected monovalent hydrocarbon group and m is at least 3; with
   (B) a cyclic diorganosilazane of the formula

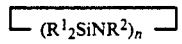

wherein $R^1$ is an independently selected monovalent hydrocarbon group, $R^2$ is selected from the group consisting of hydrogen and an independently selected monovalent hydrocarbon group and n is 3 or 4, said polymerizing being carried out in the presence of
   (C) cesium hydroxide, whereby the diorganosiloxane units and diorganosilazane units of said copolymer product are randomly dispersed therein.

2. The method according to claim 1, wherein 5 to 500 parts per million of said cesium hydroxide is employed based on the total weight of components (A) and (B).

3. The method according to claim 2, wherein said polymerizing is carried out at a temperature of 80° to 200° C.

4. The method according to claim 2, wherein 20 to 100 parts per million of said cesium hydroxide is employed based on the total weight of components (A) and (B).

5. The method according to claim 3, wherein said polymerizing is carried out at a temperature of 120° to 170° C.

6. The method according to claim 1, wherein each $R^1$ of said components (a), (b) and (B) and each $R^2$ of said component (B) is independently selected from the group consisting of alkyl radicals having 1-4 carbon atoms, alkenyl radicals having 1-6 carbon atoms and phenyl radical.

7. The method according to claim 6, wherein 5 to 500 parts per million of said cesium hydroxide is employed based on the total weight of components (A) and (B).

8. The method according to claim 7, wherein said polymerizing is carried out at a temperature of 80° to 200° C.

9. The method according to claim 8, wherein each $R^1$ of said components (a), (b) and (B) and each $R^2$ of said component (B) is independently selected from the group consisting of methyl radical, vinyl radical and phenyl radical.

10. The method according to claim 9, wherein 20 to 100 parts per million of said cesium hydroxide is employed based on the total weight of components (A) and (B).

11. The method according to claim 10, wherein said polymerizing is carried out at a temperature of 120° to 170° C.

* * * * *